United States Patent [19]

Synek et al.

[11] 4,303,805

[45] Dec. 1, 1981

[54] SUBSCRIBER STATION NETWORK

[75] Inventors: Jan Synek, Chicago, Ill.; Michael Tentler, Kenosha, Wis.

[73] Assignees: United Networks, Inc., Chicago, Ill.; Manu-Tronics, Inc., Kenosha, Wis.

[21] Appl. No.: 41,004

[22] Filed: May 21, 1979

[51] Int. Cl.³ .............................................. H04M 1/58
[52] U.S. Cl. ................................. 179/81 R; 179/81 A
[58] Field of Search ............... 179/81 R, 81 A, 81 B, 179/16 F, 170 NC, 170 T, 170.2, 170.8

[56] References Cited

U.S. PATENT DOCUMENTS 3,823,272   7/1974   Tabalba ...................... 179/170 NC
4,071,713   1/1978   Sencer ........................ 179/170 NC Primary Examiner—Bernard Konick
Assistant Examiner—J. A. Popek
Attorney, Agent, or Firm—Alter and Weiss

[57] ABSTRACT

A solid state network for subscriber stations which uses a first active element to couple both the transmitter and the receiver to the telephone lines and uses non-inductive component for compensation to minimize costly heavy components and to facilitate transmission and reception of communication signals almost independently of variations in line length.

13 Claims, 4 Drawing Figures

SUBSCRIBER STATION NETWORK

FIELD OF THE INVENTION

This invention is concerned with telephone systems; and more particularly, with improved subscriber station networks.

BACKGROUND OF THE INVENTION

The telephone subscriber stations in general include components for signaling an incoming call, for indicating the busy or idle condition of the station, for directing destinations, as well as for communication with other subscriber stations. Among the components used to facilitate the communication between connected subscriber stations are inductive elements, such as transformers. These inductive elements, besides being costly, are also cumbersome, especially in comparison with modern solid state circuitry. Another fault with the cumbersome, inductive components is that they are not amenable to hybridization.

The inductive elements are used for matching the load of subscriber station networks. The load includes the telephone lines coupling the subscriber stations to the central office. The characteristics of the lines can vary depending upon such variables as ambient climatic conditions. Networks using inductive components are used to match the substation to an average line length and ambient condition. The inductive components are not readily variable, because of cost and physical condition. Thus, the average substation is not properly matched to the telephone line.

The condition of the substation that is not properly matched, which causes the most difficulties, is, of course, where the transmission and reception of communication signals is overly attenuated. With the solvent of solid state electronics, it is easier to equip the substation with amplifiers to aid in overcoming the impedance matching problems. This, of course, is an expensive way of doing things, so that the cost effectiveness of the system rapidly deteriorates.

Accordingly, an object of the present invention is to provide new and unique electronic subscriber station networks.

Yet another object of the present invention is to provide solid state networks for subscriber stations which transmit and receive signals which are almost constant independently of variations in the line length.

Still another object of the present invention is to provide amplification both for the transmitter and receiver in the subscriber handset.

Yet another related object of the present invention is to use the same circuitry which makes the subscriber station network independent of variations in line impedance for controlling the amplitude of the side tone.

Still another object of the present invention is to provide electronic network circuits which limit the current going through the transmitter, thereby preventing its overload. The current limiting, which is inherently provided by the electronic circuit network used for controlling load matching and side tone, also eliminates the need for transmitter overload protection.

Still another object of the present invention is to provide solid state telephone networks which eliminate inductive components and are accordingly readily amenable to hybridization.

SUMMARY OF THE INVENTION

A preferred embodiment of the present invention comprises a solid state subscriber station network which provides high quality transmission and reception of communication signals on standard telephone lines. A two wire telephone line is coupled through a diode bridge circuit to the receiver and transmitter of the subset.

A first active element, such as a transistor is associated with both the transmitter and receiver. A second active element is associated with the receiver. More particularly, the transmitter is coupled across the telephone lines in series with the collector and emitter of an amplifying transmitting transistor. The receiver is coupled across the line through that same transistor in series with a receiving transistor. The base of the receiving transistor is connected to the A.C. component of the line through a side tone controlling network that extends across the line. The receiving transistor obtains signals that appear at both the line and at the emitter of the transmitting transistor. The ratio of these signals controls the gain of the receiving transistor and similarly, the ratio of the transmitted signals controls the side tone.

Both transistors act to amplify the A.C. signals of the associated receiver and transmitter. Feedback circuits using resistors and capacitors control the gain and operating points of the active elements.

The circuitry is readily adapted for rotary dial telephones, for standard multi-frequency tone telephones and for telephones using available commercial printed circuit dialing networks.

BRIEF DESCRIPTION OF THE DRAWINGS

The above mentioned and other objects and features of the invention will be best understood by making reference to the accompanying drawings, wherein.

GENERAL DESCRIPTION

Figure 1:
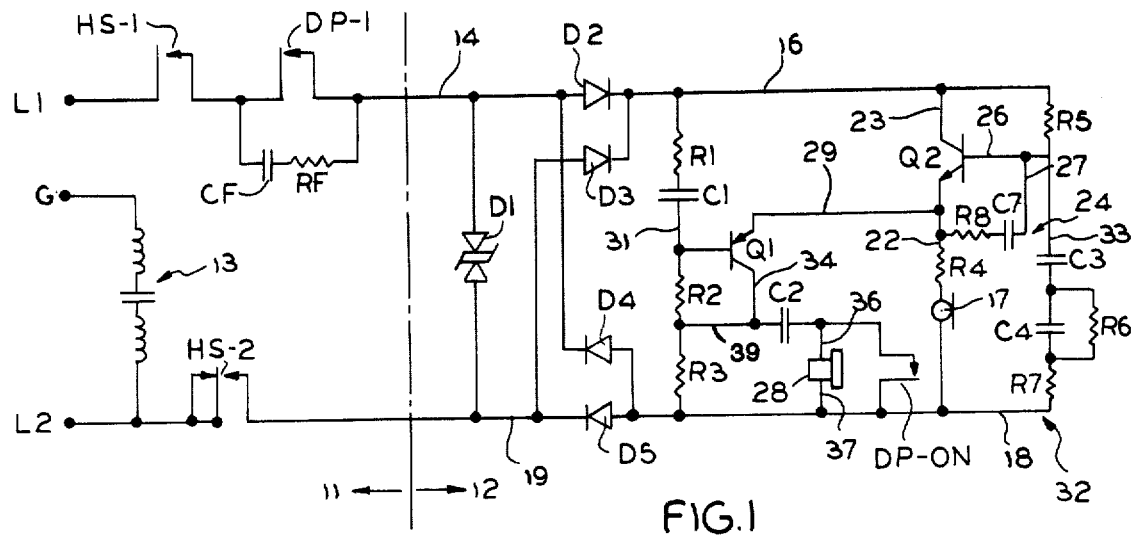
FIG. 1 is a schematic of a solid state subscriber station network connected in a rotary dial operated system.

FIG. 1 is divided by a dashed line. To the left of the dashed line are portions of a standard telephone subscriber station connected to the telephone system over lines L1 and L2. To the right 12 of the dashed line is the inventive solid state network. Line 1 is connected to the remaining telephone circuitry through hook switch contacts HS-1. As is well known, these contacts are in the normally open position until the handset is removed from the hook switch. Dial pulse contacts DP-1 are shown in series with the hook switch contacts HS-1. The dial pulse contacts are shown bridged by a filter network comprising capacitor CF in series with resistor RF.

Line 2 is shown connected to ground through the well known ringer 13. Line 2 is also shown connected to the network at 12 through well known hook switch contacts indicated as HS-2.

In the solid state telephone network 12 means are provided for protecting the network from current surges. More particularly, lines 1 and 2 are bridged by a transzorb diode D1.

Immediately after diode D1 is a rectifier bridge comprising diodes D2-D5. The loop currrent normally flows from terminal L1 through the normal telephone subscriber set components shown at 11 into section 14 of line L1 of the two line telephone system through the rectifier bridge, section 16 of line L1, an NPN transistor Q2, resistor R4, the telephone transmitter 17, line section 18 of the L2 line of the two line telephone and back through the diode bridge over line L2, line section 19 through hook switch contacts HS-2 to line L2.

The user of the telephone, in speaking into the telephone transmitter 17, modulates the loop current thereby applying an A.C. signal to the emitter of transistor Q2 over conductor 22. Transistor Q2 acts as a common base amplifier to this modulated current. The amplified signal at the collector of transistor Q2 is applied to the telephone line through conductors 23 and 16, the diode bridge, conductor 14, contacts DP-1 and contacts HS-1.

Means are provided for controlling the transmission gain of transistor Q2. More particularly, an RC network 24 comprising resistor R8 connected to conductor 22, capacitor C7, conductor 27, conductor 26, extends between the emitter and the base of transistor Q2. A resistor R5 coupled between the base and the collector of transistor Q2 determines the working point of transistor Q2. A resistor R4 in series between the emitter of transistor Q2 and microphone or transmitter 17 increases the negative current feedback.

Means are provided for balancing the side tone in the receiver 28. More particularly, NPN transistor Q1 and associated circuitry perform this function, among others. D.C. current for transistor Q1 and a portion of the transmitted signal are supplied from the emitter of transistor Q2 through conductor 29. The transmitted signal is also applied to the base of transistor Q1 over a circuit that includes conductor 16, the series circuit comprising resistor R1, capacitor C1, conductor 31, resistors R2 and R3. The base of transistor Q1 is coupled directly to conductor 31. The transmitted signals comming to the base and the emitter of transistor Q1 are in phase. Therefore, by adjusting the level of the individual signals, it is possible to adjust the amplitude of the side tone or, in fact elminate it completely.

Means are provided to compensate for the effects of line impedance. More particularly, a line impedance compensating network 32 is provided. The compensating network 32 comprises the series connection of capacitors C3, C4 and resistor R7. One side of capacitor C3 is connected to the base of transistor Q2 through conductor 26. One side of capacitor C4 is connected through resistor R7 to line section 18. Capacitor C4 is bridged by resistor R6.

The circuit thus described has extreme sensitivity to line impedance changes due to the negative feedback generated at transistor Q2. It has been noted that a change in the nature of a multiple of five in the line impedance does not unbalance the circuit.

Means are provided for amplifying the received signal from the telephone line. This means includes the previously described transistor Q1. The received signal from line section 16 goes through resistor R1, capacitor C1 and conductor 30 to the base of transistor Q1. At the collector of transistor Q1 the received signal is amplified. The amplified signal is connected to the receiver 28 through capacitor C2 and conductor 36. The other side of the receiver is coupled to line section 18 through conductor 37. The receiver is shown as being bridged by dial pulse off-normal contacts DP-O.N.

A portion of the received signal appears at the base of transistor Q2 passing through a divider network comprising resistor R5 and network 32. In this situation transistor Q2 acts an an emitter follower for the received signal and transmits that received signal to the collector of transistor Q1 over conductor 29. The received signal is amplified by transistor Q1, if the signal on the base of transistor Q1 is higher than the signal on the collector of transistor Q1. The gain of transistor Q1 is adjusted by selecting a ratio of the incoming signal received by transistor Q1 directly from the line and the incoming signal received by transistor Q1 from transistor Q2. The capacitor C2 in conjunction with resistor R3 prevents the D.C. signals from going through the receiver.

Since the transistor Q2 electronic circuit described acts as a constant current source, it inherently limits the current through the transmitter and precludes overloading. Thus, the varistors normally used to protect the transmitter are not required in this circuit.

The transmitted signal level is automatically adjusted by the feedback of the above described circuitry for different loop lengths. The longer the loop, the higher the transmitted signal. The automatic signal level adjustment equalizes the signal at the central office. It should be noted that all parameters of the electronic network can be set to match standard telephone networks. Also, it is possible to increase the gain for the received sigal or the transmitted signal or both signals, if needed.

Figure 2:
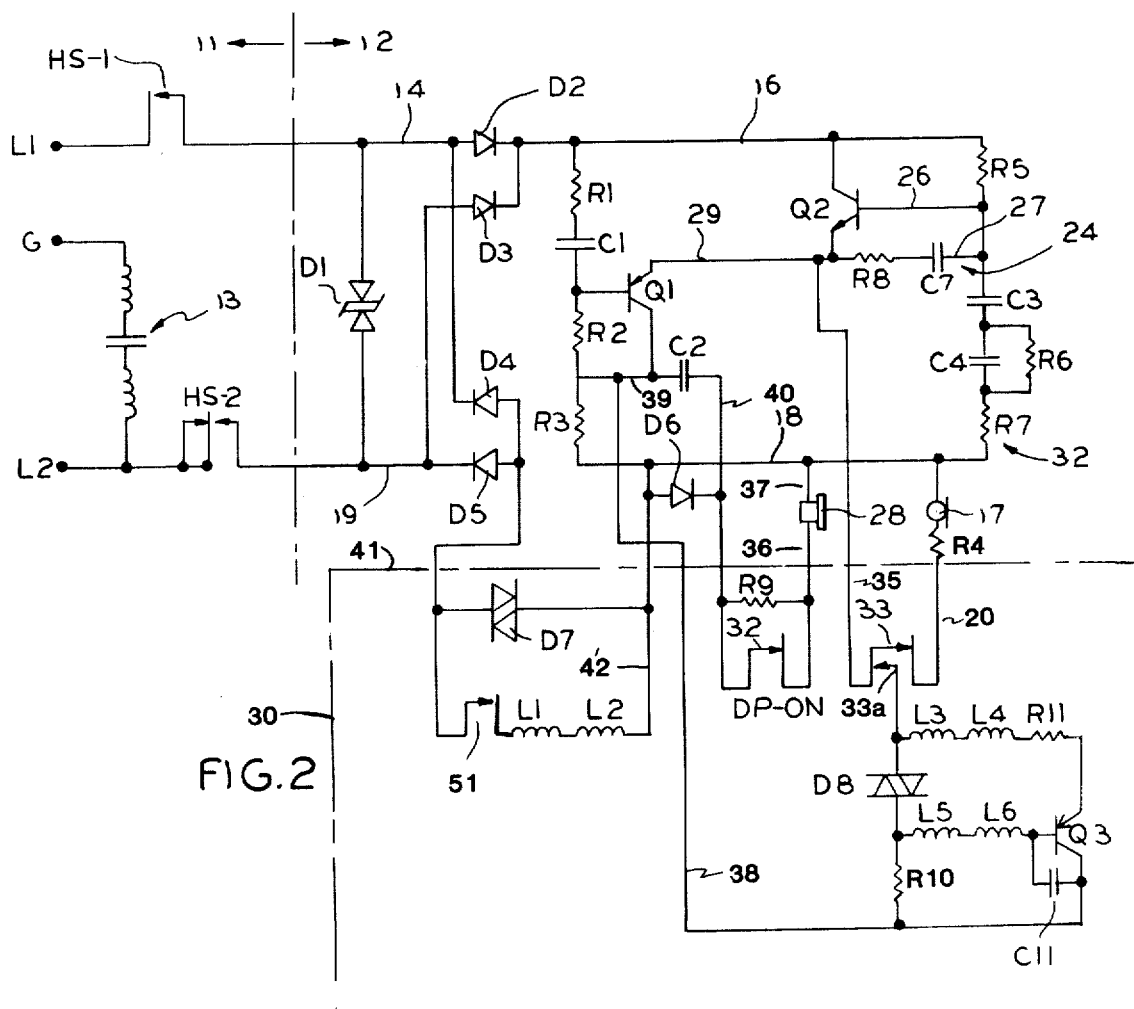
FIG. 2 is a schematic of the solid state subscriber station network connected in a multi-frequency tone operated system.

In FIG. 2 the same component designations are used for the same parts of the solid state telephone network of FIG. 1. Thus, the solid state telephone network of FIG. 2, as shown uses the basic components of the solid state telephone network of FIG. 1, except that FIG. 2 shows a dial tone multifrequency telephone system, rather than a rotary dial telephone system. For example, the network coming from the telephone lines at 11 is exactly the same as that described in FIG. 1, except for the absence of the dial pulse contacts in line L1.

A simplified showing of a standard dial tone multifrequency key pad 30 is included in FIG. 2. The transmitter 17 is shown connected through the key pad to the emitter of transistor Q2. More particularly, a path is provided from line section 18, transmitter 17, resistor R4, conductor 36, common contacts and conductor 35, conductor 29 to the emitter of transistor Q2. When any digit button is operated, the common contacts all operate. For example, the contacts 33 open and contacts 33a close.

The contacts 33a couple an oscillator to transistor Q2. The oscillator comprises a PNP transistor Q3 and associated circuitry.

The collector of transistor Q3 is coupled to line section 18 through conductors 38, 39 and resistor R3. The emitter of transistor Q3 is also coupled to conductor 38 through the series connection of resistor R1, inductors L3 and L4, contacts 33a, a varistor diode D3 and resistor R10. The base of transistor Q3 is coupled to the junction of diode D8 and resistor R10.

The telephone line diode bridge is connected into the key pad over conductor 41, normally closed common contacts 51 of the key pad 30, inductors L1 and L2 and conductor 42 to line section 18. A varistor D7 is connected from conductor 41 to conductor 42, where it shorts the multifrequency signals, when contacts 51 are closed.

The receiver 28 is connected through key pad 30 to receiver amplifying transistor Q1. More particularly, a path extends from line section 18, through conductor 37, receiver 28, conductor 36, common contacts 32, conductor 40 and capacitor C2 to the collector of transistor Q1. The common contacts are bridged by resistor R9. A receiver clamping diode D6 connects conductor 40 to conductor 18. Resistor R9 serves to mute the receiver during transmission of the dial tones.

Thus, the electronic network readily interfaces with multi-frequency dial systems. Transistor Q2 serves to amplify the output of the oscillator. The benefit of the lightweight, inexpensive reliable and compensated system is that, among other things, it is operable with both multifrequency and pulse dialing telephones.

There are now commercially available integrated circuit dials, such as the Motorola MC 14409. The electronic telephone network described herein is also amenable to use with such dialers.

Figure 3:
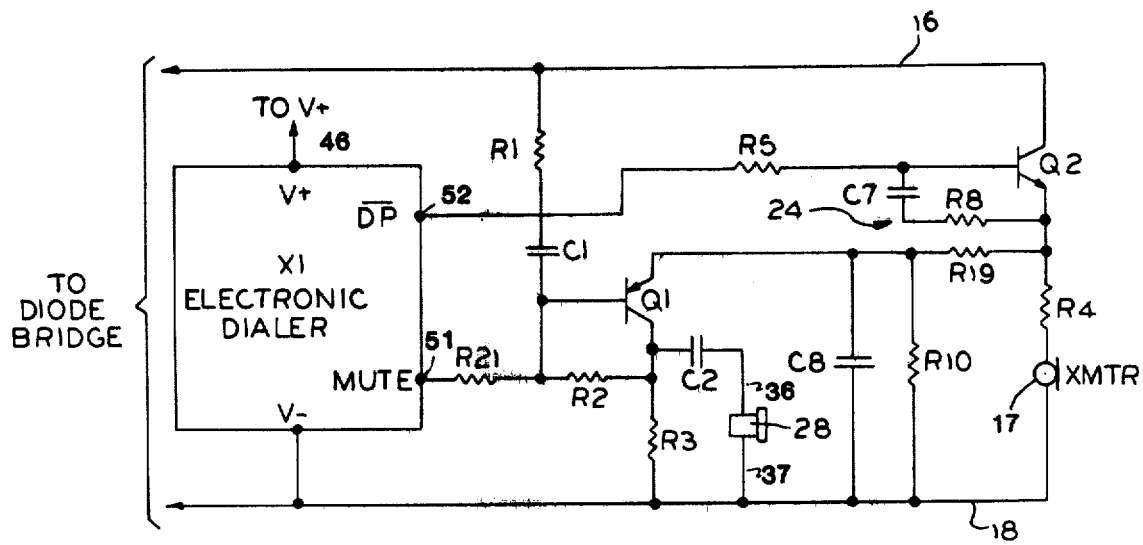
FIG. 3 is a schematic of the solid state subscriber station network interfaced with a commercially available integrated electronic dial system.

FIG. 3 shows the interface between a Motorola MC 14409 circuit dialer and the FIG. 1 solid state telephone network. Again, where possible, components in FIG. 3 bear the same designation numbers as the components in FIG. 1.

The electronic dialer is indicated as X-1. It is shown connected to positive voltage at arrow 46. The line portions 16 and 18 are shown terminating in arrows leading to the diode bridge previously shown. The negative voltage terminal of dialer X-1 is connected to line section 18. It should be understood that the positive and negative signals are examples only. The voltages could be reversed by using PNP transistors in place of the NPN transistors and vice versa, for example.

Means are provided for muting the receiver during dialing. More particularly, the junction of resistors R2, capacitor C1 and the receiver of transistor Q1 is connected through resistor R21 to the mute terminal 51 of the electronic dialer.

Dial pulse amplifying means are provided. More particularly, the collector of transistor Q2 is connected directly to line section 16. The base of transistor Q2 is now coupled through resistor R5 to the dial pulse terminal $\overline{DP}$ of the electronic dial X-1. The transmitter is connected to the emitter of transistor Q2 through resistor R4.

The emitter of transistor Q2 is connected to the emitter of transistor Q1 through resistor R19. The junction of resistor R19 and the emitter of transistor Q1 is connected to conductor 18 through resistor R10. A supply capacitor C8 bridges resistor R10. The supply capacitor is of a size that provides power, but still enables feedback.

Figure 4:
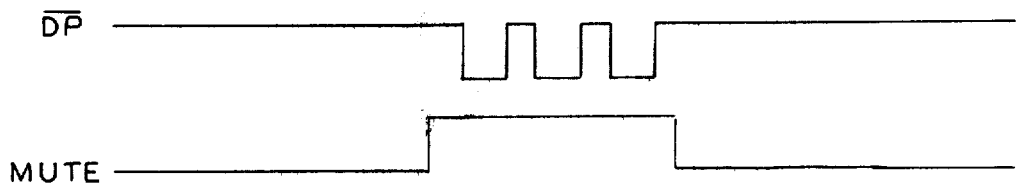
FIG. 4 indicates certain of the outputs of the electronic dial system.

FIG. 4 shows a typical timing diagram when the digit 3 has been dialed indicating the dial pulse lengths and the muting signal lengths.

The difference in operation of FIG. 3 and the electronic circuitry of FIGS. 1 and 2 is that transistor Q2 is used for dial signal commutation as well as for transmitter amplification. The low level pulses on the dial pulse terminal $\overline{DP}$ turns transistor Q2 to the off condition through resistor R5. The transistor Q2 is normally held in the active condition by the high level voltage on the $\overline{DP}$ output terminal.

In this circuit, transistor Q2 also works as a voltage follower and constant current source. The loop current in the telephone line and through the transmitter is determined by the voltage level at the $\overline{DP}$ output terminal. It is entirely independent of the loop length.

Transistor Q1, in addition to its function as a receiver amplifier, also operates to mute the receiver during dialing. Transistor Q1 is turned off by a high level on the mute terminal 51 through resistor R21.

Typical component values in the circuitry of FIG. 1 are:

| R1 = 22K Ohms | R6 = 13K Ohms | C3 = .22μfd. |
| R2 = 22K Ohms | R7 = 10K Ohms | C4 = .022μfd. |
| R3 = 390 Ohms | R8 = 100 Ohms | C7 = 10μfd. |
| R4 = 100 Ohms | C1 = .22μfd. | Q1 = 2 N 5401 |
| R5 = 22K Ohms | C2 = 10μfd. | Q2 = 2 N 3053 |

Thus, the electronic telephone network performs the functions of the telephone networks that use "iron" in a more efficient manner and is amenable for hybridization and for use with rotary dial systems, with dial tone multi-frequency systems and with commercially available integrated circuit dialers.

While the principles of the invention have been described above in connection with specific apparatus and applications, it is to be understood that this description is made by way of example only and not as a limitation on the scope of the invention.

We claim:

1. An improved telephone subscriber station network, said network comprising telephone lines for connecting the subscriber station to other subscriber stations, said telephone lines comprising at least two lines having a D.C. potential therebetween, receiver means for receiving communication signals from said lines, transmitter means for transmitting communication signals over said lines, first solid state electronic means coupling said transmitter means and said receiver means to said telephone lines while automatically compensating for losses on said telephone lines, second solid state electronic means coupling said receiver means to said telephone lines through said first solid state electronic means, said second solid state electronic means operating in conjunction with said first solid state electronic means for adjusting the sidetone in said receiver means and for adjusting the level of the communication signals received from the telephone lines by the receiver means, and said improved subscriber station network using non-inductive components for the compensation.

2. The improved subscriber station network of claim 1 wherein said network is used in conjunction with telephone apparatus utilizing rotary dial equipment, wherein:

dial pulse off normal contacts are provided bridging said receiver means.

3. An improved telephone subscriber station network, said network comprising telephone lines for connecting subscriber stations to other subscriber stations, said telephone lines comprising at least two lines having a D.C. potential therebetween, receiver means for receiving communication signals from said lines, transmitter means for transmitting communication signals over said lines;

first solid state electronic means coupling said transmitter means to said telephone lines for automatically compensating for losses on said telephone lines, said first solid state electronic means comprising a transmitter transistor for amplifying the communication signals generated at said transmitter means, said transmitter means coupled in series with the emitter and collector of said transmitter transistor, voltage divider network means coupled between said at least two lines, said voltage divider network means comprising a first resistor in series with a line compensating network, the base of said transmitter transistor being connected to the junction of said first resistor means and said line impedance compensating network, and means connected in the circuit including the transmitter and the transmitter transistor for controlling the transmission gain of said transmitter.

4. The improved subscriber station network of claim 3 wherein said transmission gain control means comprises a series resistor capacitor network coupled between the base and the emitter of said transmitter transistor, and wherein said coupling means for coupling said transmitter to said transmitter transistor comprises a second resistor which increases negative feedback through said transmitter transistor.

5. The improved subscriber station network of claim 4 wherein said line impedance compensating network comprises a resistor capacitor network having first and second capacitors in series with a third resistor between the base of said transmitter transistor and one of said lines, fourth resistor bridging said second capacitor.

6. The improved subscriber station network of claim 3 including second solid state electronic means coupling said receiver means to said telephone lines, said second solid state electronic means controlling the sidetones through said receiver means and amplifying the signal at said receiver means obtained from said telephone lines.

7. The improved subscriber station network of claim 6 wherein said second solid state electronic means comprises a receiver transistor wherein the base of said receiver transistor is coupled to an A.C. divider network extending between the telephone lines, the emitter of said receiver transistor being coupled to the emitter of said transmitter transistor, the collector of said receiver transistor being A.C. coupled to said receiver, whereby said receiver means transistor receives first signals through said transmitter transistor acting as an emitter follower and second signals at the base of said receiver transistor, and wherein the ratio between the first and second signals determines the amplitude of the sidetone and of the received signal.

8. The improved subscriber station network of claim 7 used in conjunction with dial tone multi-frequency dialing systems.

9. The improved subscriber station network of claim 8 wherein said transmitter means is connected to the emitter of said transmitter through normally closed common contacts of the key pad of said dial tone multi-frequency dialing system, and wherein said receiver means is A.C. coupled to the collector of said receiver transistor through common contacts of the tone multi-frequency dialing system.

10. The improved subscriber station network of claim 7 used in conjunction with an electronic dialer including means for coupling said transmitter transistor to commutate the dial pulses from the electronic dialer, and power supply capacitor means coupled between one of said lines and the emitter of said receiver transistor, and means for causing the transmitter transistor to operate as a constant current source.

11. The improved subscriber station network of claim 10 wherein said emitter of said transmitter transistor is coupled to other said telephone lines through a resistor network comprising at least two series resistors, and means for coupling the emitter of said receiver transistor to the junction of said at least two series resistors.

12. An improved subscriber station network for telephone systems including telephone lines for connecting said subscriber station to other telephone subscriber stations, said telephone lines comprising at least two lines having a D.C. potential therebetween, telephone receiver means for receiving communication signals from said lines, telephone transmitter means for transmitting communication signals over said lines, the improvement characterized in this that a first solid state electronic means couple both said transmitter means and said receiver means to said telephone lines for controlling transmitted and received signals for keeping the amplitude of the signals constant independent of line length, second solid state electronic means in series between said first solid state electronic means and said receiver means, means for controlling the gain of said second solid state electronic means responsive to signals on said telephone lines, and said first and second solid state electronic means being coupled together to control the amplification of said received signal and the sidetone from said transmitted signal.

13. The improved subscriber station of claim 12 wherein line impedance compensation means are coupled to the first solid state electronic means for assuring that the level of said communication signals are substantially constant independent of line length.

* * * * *